United States Patent [19]

Wagner et al.

[11] Patent Number: 4,851,015
[45] Date of Patent: Jul. 25, 1989

[54] MUFFLER APPARATUS WITH FILTER TRAP AND METHOD OF USE

[75] Inventors: Wayne M. Wagner, Apple Valley; Douglas E. Flemming, Rosemount; Edward A. Steinbrueck, Minneapolis; Bruce B. Hoppenstedt, Bloomington, all of Minn.

[73] Assignee: Donaldson Company, Inc., Minneapolis, Minn.

[21] Appl. No.: 88,055

[22] Filed: Aug. 21, 1987

[51] Int. Cl.⁴ .................... B01D 39/20; F01N 3/02
[52] U.S. Cl. .................... 55/20; 55/96; 55/267; 55/272; 55/283; 55/523; 55/DIG. 5; 55/DIG. 10; 55/DIG. 30; 29/520; 60/313; 181/231
[58] Field of Search .................... 55/96, 267, 270, 272, 55/276, 283, 286–288, 523, DIG. 5, DIG. 30, 20; 181/231, 255, 258, 269; 60/311–313, 320, 324; 29/163.5 F, 243.52, 511, 520

[56] References Cited

U.S. PATENT DOCUMENTS

| | | | |
|---|---|---|---|
| 2,600,262 | 6/1952 | Powers | 55/276 |
| 2,699,707 | 1/1955 | Bezborodko | 29/520 X |
| 3,043,096 | 7/1962 | McLoughlin | 60/30 |
| 3,399,516 | 9/1968 | Hough, Jr. et al. | 55/498 X |
| 3,462,666 | 8/1969 | Martinek | 318/124 |
| 3,499,269 | 3/1970 | Bois | 55/309 |
| 3,696,666 | 10/1972 | Johnson et al. | 73/118 |
| 3,754,619 | 8/1973 | McCormick | 55/DIG. 30 X |
| 3,771,315 | 11/1973 | Scott | 55/DIG. 30 X |
| 3,772,751 | 11/1973 | Lovett | 29/520 X |
| 3,966,419 | 6/1976 | Bloomfield | 60/322 X |
| 4,147,230 | 4/1979 | Ormond et al. | 181/231 |
| 4,167,852 | 9/1979 | Ludecke | 60/296 |
| 4,211,075 | 7/1980 | Ludecke et al. | 60/285 |
| 4,212,657 | 7/1980 | Urbinati | 55/DIG. 30 X |
| 4,270,936 | 6/1981 | Mann | 55/520 |
| 4,273,879 | 6/1981 | Langer et al. | 521/91 |
| 4,276,066 | 6/1981 | Bly et al. | 55/287 |
| 4,276,071 | 6/1981 | Outland | 55/523 |
| 4,281,512 | 8/1981 | Mills | 55/283 X |
| 4,361,206 | 11/1982 | Tsai | 181/255 |
| 4,364,210 | 12/1982 | Fleming et al. | 52/221 |
| 4,373,330 | 2/1983 | Stark | 60/311 |
| 4,404,795 | 9/1983 | Oishi et al. | 55/282 X |
| 4,436,535 | 3/1984 | Erdmannsdörfer et al. | 55/96 |
| 4,450,682 | 5/1984 | Sato et al. | 55/283 X |
| 4,485,622 | 12/1984 | Takagi et al. | 55/287 X |
| 4,504,294 | 3/1985 | Brighton | 55/DIG. 30 X |
| 4,505,107 | 3/1985 | Yamaguchi et al. | 55/283 X |
| 4,523,935 | 6/1985 | Takagi et al. | 55/DIG. 30 X |
| 4,535,589 | 8/1985 | Yoshida et al. | 55/283 X |
| 4,610,138 | 9/1986 | Shinzawa et al. | 55/283 X |
| 4,632,216 | 12/1986 | Wagner et al. | 181/255 |
| 4,634,459 | 1/1987 | Pischinger et al. | 55/418 |
| 4,671,059 | 6/1987 | Lawson | 60/309 |
| 4,693,338 | 9/1987 | Clerc | 181/231 |
| 4,720,972 | 1/1988 | Rao et al. | 60/274 |
| 4,744,216 | 5/1988 | Rao et al. | 60/303 |

FOREIGN PATENT DOCUMENTS

WO85/02785 7/1985 PCT Int'l Appl. .................. 55/276
A2134407 8/1984 United Kingdom .

OTHER PUBLICATIONS

Donaldson Drawing No. 5215B94 "Particulate Arrestor Assembly." (8/1984).
Booklet: "Corning Ceramics Dieselfilter Product Data Brochure," Industrial Ceramics Dept., Corning Glass Works Corning, NY, 14831, 8-85.

(List continued on next page.)

Primary Examiner—Robert Spitzer
Attorney, Agent, or Firm—Merchant, Gould, Smith, Edell, Welter & Schmidt

[57] ABSTRACT

Muffler apparatus for reducing both sound and particulates from exhaust gases from an engine. The apparatus includes resonating chambers, flow distribution structure and a cellular ceramic core filter module. Filter regeneration mechanism includes a heating element for heating the carbon on the inlet end of the ceramic core to combustion temperature. Particulate ignition resulting in regeneration occurs when combustion air is provided; in alternate embodiments, combustion air first flows through a preheater system. A processor unit with particular logic controls the apparatus.

27 Claims, 9 Drawing Sheets

OTHER PUBLICATIONS

Article 840074 "Design Considerations for Mounting Material for Ceramic Wall-Flow Diesel Filters." Gulati et al. (1984).

Article 840174 "Particulate Control Technology and Particulate Standards for Heavy Duty Diesel Engines." Weaver.

Article 870012 "Development and Selection of Diesel Particulate Trap Regeneration System." Arai et al.

Gulati, S. T., "Thermal Stresses During Successful Regeneration of the Large, Segmented, EX-47 Filter using Electrical Coil Face Heater," Nov. 29, 1983.

Gulati, S. T. et al., "Electrical Regeneration of Ceramic Wall Flow Diesel Filters for Underground Mining Application," Mar. 1, 1985.

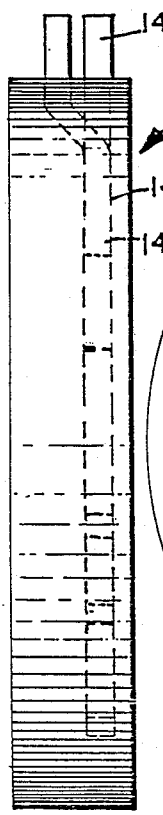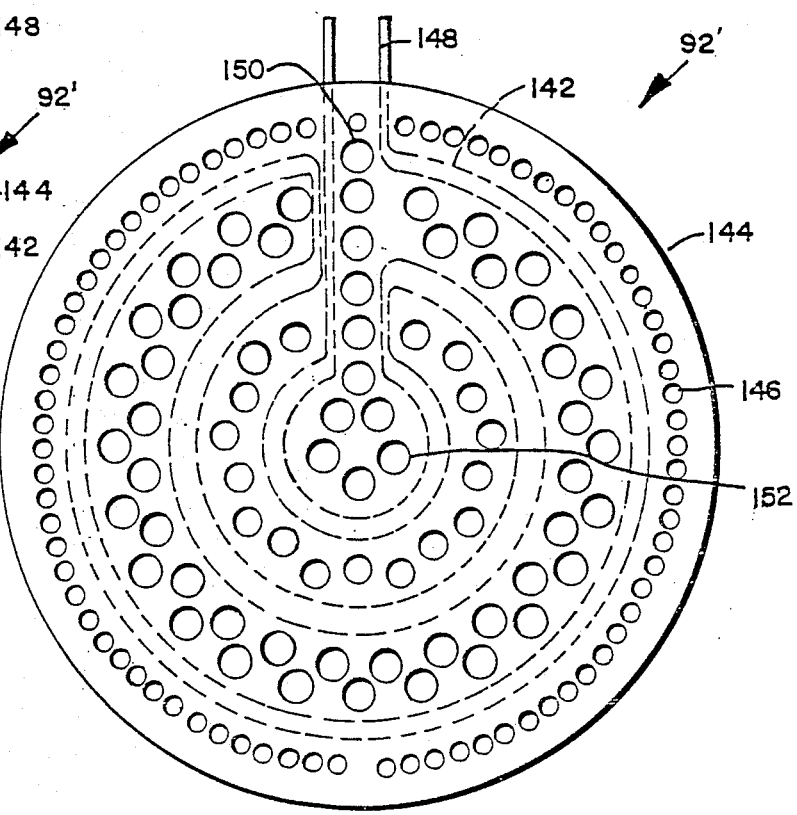

MUFFLER APPARATUS WITH FILTER TRAP AND METHOD OF USE

FIELD OF THE INVENTION

The invention is directed generally to muffler devices for vehicles, primarily vehicles powered by diesel engines. The muffler includes a filter trap for capturing particulates exhausting from the engine and provides a regenerating mechanism for oxidizing the particulates and emitting them as a nonpolluting gas.

BACKGROUND OF THE INVENTION

Particulate emissions by diesel-engine vehicles became a subject of great concern to both environmental regulators and the automotive industry during the late 1970's and early 1980's. The concern was prompted by the low supply of oil and the introduction of diesel engines in a greater number of models of passenger cars and light trucks. At the time, it was thought to be a wide trend toward dieselization. Although diesel engines are normally more expensive than gasoline engines, they are also much more efficient and, hence, the value of the higher efficiency propelled their popularity during that period. The prospect of greatly increased numbers of diesel vehicles, especially in urban areas, generated concern about the impact of diesel particulate emissions on ambient air quality. Diesel particulate material is easily respired, incorporates potentially mutagenic and carcinogenic chemicals, and strongly absorbs light leading to degraded visibility in some areas. In response to these concerns, regulations by various agencies were promulgated.

In response to the need to reduce diesel particulate emissions, vehicle and engine manufacturers began to attempt to reduce the amount of particulate matter generated by the engine and/or to remove the particulate matter from the exhaust gas. The latter approach is relevant to the present invention. The latter approach in general uses a device known as a trap-oxidizer. A trap-oxidizer system generally includes a temperature resistant filter (the trap) from which particulates are periodically burned off (oxidized), a process commonly known as regeneration. The traps must be regularly regenerated so as not to become excessively loaded and create an undesirable back pressure thereby decreasing engine efficiency. Since the particulate material captured by the trap is mainly carbon and hydrocarbons, its chemical energy is high. Once ignited, it burns readily and releases a large amount of heat.

Possible traps for capturing diesel particulate emissions primarily include cellular ceramic elements (see U.S. Pat. No. 4,276,071) and catalytic wire-mesh devices (see U.S. Pat. No. 3,499,269). The present invention uses cellular ceramic filter elements.

Trap-oxidizer regeneration systems can be divided into two major groups on the basis of control philosophy. One group is positive regeneration systems; the other group is self-regeneration systems. Positive regeneration systems are relevant to the present invention and have included use of a fuel fed burner (see U.S. Pat. No. 4,167,852), use of an electric heater (see U.S. Pat. Nos. 4,270,936; 4,276,066; 4,319,896; and British published application No. 2,134,407) and detuning techniques which aim to raise the temperature of exhaust gas temperature at selected times (see U.S. Pat. Nos. 4,211,075 and 3,499,260). Self generation systems are directed to the use of fuel-additives containing catalytic metals or the use of catalytic treated traps to lower the ignition temperature of the captured particulates.

Although, as indicated, there has been effort directed to reducing the emission of diesel particulates, a simple, reliable and efficient trap system has not been available. Prior art systems have tended to be an aggregation of items which when linked together theoretically are directed to solving the problem. None of the known systems, however, are directed to the total exhaust problem, that is, both muffling sound and making emissions environmentally acceptable.

SUMMARY OF THE INVENTION

The present invention is directed to a particulate filter module of a type for trapping diesel particulate emissions and a method of manufacturing the module. The invention is also directed to muffler-filter apparatus which includes the module along with sound attenuating mechanism, as well as a method of using such muffler-filter apparatus.

The particulate filter module of the present invention includes a ceramic filter element enclosed along a side region by a rigid housing. The housing has mechanism for longitudinally retaining the ceramic filter element between opposite ends. The module also has mechanism for cushioning the filter element with respect to the rigid housing and for resisting heat transfer from the filter element to the housing, as well as mechanism for sealing the cushioning mechanism between the filter element and the housing at the opposite ends of the rigid housing in such a way as to be partially compressed between the filter element and the longitudinal retaining mechanism at the ends of the rigid housing which then also puts the ceramic core in axial preload.

The method for making the particulate filter module includes steps of wrapping the side region of the ceramic filter element with an intumescent cushioning and heat resistant material, slipping the wrapped filter element into a housing, placing sealing mechanism at ends of the heat resistant material, and forming inwardly turned ends on the housing to compress a portion of the sealing mechanism between the filter element and the inwardly turned ends.

The present method may be of further advantage in certain cases to include steps of partially prerolling a metallic sheet before slipping the wrapped ceramic filter into it and thereafter squeezing the rolled sheet to a predetermined cylindrical dimension and welding the seam thereof. It may be of still further advantage to heat the completed module before use to cure the intumescent and heat resistant material.

The module is particularly advantageous since it is modular and yet includes many features important to proper use of a cellular ceramic element. In the modular form, the element may be used in a particular housing, removed for regeneration, and stored or installed in the same or a different housing. Additionally, the modular concept leads to simpler manufacture of larger assemblies, such as muffler apparatus.

The present ceramic filter module has intumescent, heat resistant material about the ceramic element to transversely compress the ceramic element and to contain the heat during regeneration of the element. The material has a diagonal joint so that the seam is not a ready source of leakage. Additionally, the heat resistant material is sealed in place at the ends of the ceramic element.

Of further importance, the housing includes inwardly turned ends which not only compress the seal, but provide an axial, preloaded containment for the ceramic element. Thus, the heat resistant material transversely loads and cushions the ceramic element with respect to side shock. The ends of the housing provide an axial load. Such construction minimizes ceramic cracking, and if cracking occurs, resists crack continuation. In this regard, such construction also allows for different thermal growth of the ceramic element and the metallic housing by providing a transition for different movement of the ceramic element and the metallic housing during thermal cycling. Thus, the present construction provides the advantages of a module and also the advantages of protecting the ceramic element with respect to the environmental conditions it experiences.

In this regard, the method of making the ceramic filter module considers the fragile and brittle characteristics of the components and leads to minimizing defects in the final product. Of particular note is the simultaneous curling of the ends of the housing and equal compressing thereby to the ends of the ceramic element.

The muffler-filter apparatus of the present invention reduces both sound and particulates from exhaust gases of an engine. The apparatus includes a housing within which there are both mechanism for attenuating sound and mechanism for filtering particulates. In this regard, there are also mechanism for heating the inlet end of the filtering mechanism to obtain combustion and therefore regeneration, as well as mechanism for controlling the heating mechanism.

Of particular advantage then with respect to the present invention is the dual result of filtering particulate from and muffling the sound of exhaust gases. Of further particular import is that the heating mechanism functions to heat primarily by radiation, thus simplifying the heating sub-assembly.

The ceramic filter module is a preferred filtering device for the apparatus. In order to obtain a preferable distribution of particulates radially with respect to the axis of the filter module, the muffler-filter apparatus advantageously includes deflecting mechanism to direct flow of the exhaust gases away from the center portion of the filter module. In this way, during regeneration, heat in the center of the filter does not build excessively and is better distributed thereby further alleviating the possibility of cracking.

Various embodiments provide further advantages with respect to the heating sub-assembly. For example, one embodiment provides for a more rapid and uniform heating of the ceramic element face by blowing a low flow of air across the heating element until the face reaches a temperature near the combustion temperature, then the further rise is achieved by radiation only. In this way there is time for temperature across the face to become uniform before combustion starts. Another embodiment provides for an injector to atomize diesel fuel or other liquid combustible onto the heating element to create a flame which at a reduced electrical power consumption creates a very hot heat source thereby rapidly heating the face of the heating element. A further embodiment provides a reflecting surface for back scatter radiation so that most of the available heat is kept near the face of the filter element.

Another distinct advantage of the present apparatus is the use in some embodiments of a resonating chamber to hold heat storage granules along with a preheating element for the purpose of preheating combustion air directed therethrough during the regeneration of the ceramic filter element.

Also, the present apparatus advantageously compares a ratio of a baseline differential pressure upstream from the ceramic element to a differential pressure across the ceramic element. The ratio is compared to a predetermined value to determine when sufficient loading is present and regeneration should be started. In this way, exhaust temperature, pressure and flow of the engine have little influence on system control.

The method of using the present muffler-filter apparatus includes the steps of comparing the indicated differential pressure ratio to a predetermined value, and if the comparison results in a triggering relationship, then a diverter valve is functioned to direct exhaust gases away from the flow path through the housing and the heating mechanism is turned on. Although not necessary, air from an air source may be directed at a low flow rate across the heating element toward the ceramic core face as the face heats. At a core face temperature differential below combustion temperature, the air is turned off. After further heating and when the core face reaches combustion temperature, combustion air at a high flow rate is directed into the ceramic core element. A timer is started so that at the end of a timed period, whereupon regeneration should be complete, the diverter valve is opened and the flow of combustion air is stopped. The heaters are turned off after combustion starts and before it ends.

The present method of use is simple and does not require steps unimportant to regeneration and reuse of the muffler-filter apparatus as soon as possible. In fact, in some cases, it may be possible to continue to direct exhaust gases through the muffler-filter apparatus during regeneration, as long as sufficient combustion air is also present.

The present invention is thusly summarized, and many advantages of the invention have been indicated. The invention and its advantages may be better understood, however, by reference to the drawings briefly described hereinafter and the detailed description of a preferred and other embodiments following thereafter.

BRIEF DESCRIPTION OF THE DRAWINGS

FIG. 3 is a plan view of a heating element of a type which can be used to heat the inlet face of a ceramic filter element in accordance with the present invention;

FIG. 4 is a side view of the heating element of FIG. 3;

DETAILED DESCRIPTION OF THE PREFERRED EMBODIMENTS

Figure 1:
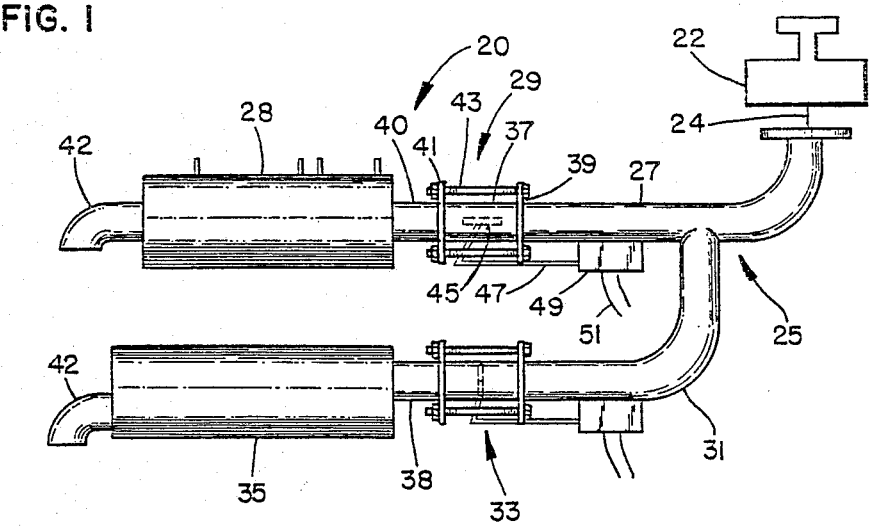
FIG. 1 is an illustration of an exhaust system having a muffler-filter apparatus in parallel with a conventional muffler in accordance with the present invention.

Referring now to the drawings wherein like reference numerals designate identical or corresponding parts throughout the several views, and more particularly to FIG. 1, an exhaust system of the type which can carry diesel particulate emissions as addressed by the present invention is designated generally by the numeral 20. Exhaust system 20 is illustrated to be in fluid communication with diesel engine 22 via line 24. Line 24 leads to connecting pipe 25 which includes a split so that one line 27 connects with valve 29 while the other leg 31 connects with valve 33. Valve 29 is connected via line 40 with muffler-filter apparatus 28 which leads to one tail pipe 42. Valve 33 connects with line 38 leading to muffler 35 and then a second tail pipe 42.

Valves 29 and 33 are preferably two-way conventional brake valves modified only in that leakage across the gate is necessary in the usual application, while in the present invention any leakage is eliminated. Considering valve 29, it typically includes a tubular portion 37 having opposite ends for fitting into seats (not shown) in flanges 39 and 41. Tubular portion 37 is clamped between flanges 39 and 41 by a plurality of nut and bolt combinations 43 which extend between the flanges. Valve 29 includes a pivotable gate 45 connected by linkage 47 to an actuator 49. Actuator 49 may be operated hydraulically, pneumatically, by vacuum, electrically, mechanically or by any other suitable means. Lines 51 illustrate a connection to a control mechanism (not shown). The control mechanism preferably provides for synchronization between valves 29 and 33, although mechanical linkage may also serve that function.

A control logic for system 20 has valve 29 open and valve 33 closed during normal operation so that exhaust gases flow from motor 22 through line 24 and leg 27 of connecting pipe 25, and through valve 29 and line 40 to muffler-filter apparatus 28 and then tail pipe 42. In this way, the sound due to the exhaust gases is attenuated and particulates are removed. When it is sensed, as described in more detail hereinafter, that the filter of apparatus 28 should be regenerated, valve 29 is closed and valve 33 is opened. In this way, the regeneration system of apparatus 28 can function, while the sound of the exhaust gases is muffled in muffler 35 by passing alternatively through leg 31 of connecting pipe 25 and then to valve 33 and line 38 for input to muffler 35 and output at tail pipe 42. The concept of system 20 is that for most of the system operational time, exhaust gases pass through muffler-filter apparatus 28 and are cleaned so as to exceed regulations. During the short regeneration time, the exhaust gases are not cleaned, although acceptable sound attenuation continues to occur. In any case, when the particulate level of total exhaust gases emitted from apparatus 28 and muffler 35 is averaged, the particulate level exhausted is well within regulations.

Figure 1A:
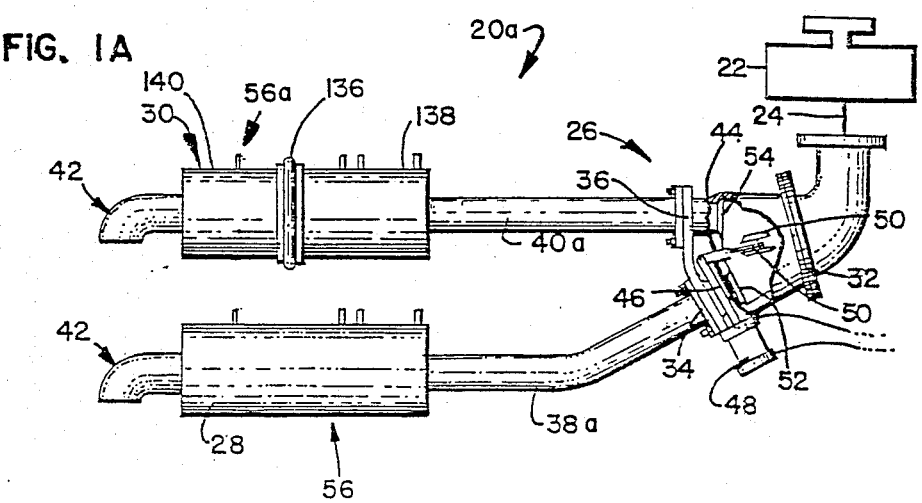
FIG. 1A is an alternate embodiment of an exhaust system which includes muffler-filter apparatus in parallel.

Alternate system 20A in FIG. 1A provides sound attenuation and filtering functions at all times. System 20A is illustrated to be in fluid communication with diesel engine 22 via line 24. Line 24 leads to a diverter valve 26 and muffler apparatuses 28 and 30 in parallel. Diverter valve 26 has a single inlet 32 with a pair of outlets 34 and 36. Inlet 32 is in fluid communication through line 24 with engine 22. Outlet 34 is in fluid communication through line 38a with muffler-filter apparatus 28. Outlet 36 is in fluid communication through line 40a with muffler-filter apparatus 30. Muffler-filter apparatuses 28 and 30 each have ceramic filter modules 90. Muffler-filter apparatuses 28 and 30 also have tailpipes 42.

Valve 26 functions to divert exhaust gases from one muffler-filter apparatus to another so that when one filter module is being regenerated, exhaust gases do not pass to atmosphere without being filtered, but rather must first pass through the filter module in the other muffler-filter apparatus. A typical diverter valve 26 as shown in FIG. 1A may be of a three way diverter type which includes a pivot arm 44 controlled by a plunger arm 46 of a solenoid or air cylinder 48. Sealing disks 50 are attached to opposite sides of one end of pivot arm 44 to mate with either seat 52 leading to outlet 34 or seat 54 leading to outlet 36. Thus, with plunger arm 46 fully drawn into actuator 48, one of sealing disks 50 closes seat 54 and prevents exhaust emissions from further flowing through muffler-filter apparatus 30. On the other hand, with plunger arm 46 fully extended from solenoid 48, the other of sealing disks 50 fits into seat 52 and opens exhaust gas flow to muffler-filter apparatus 30 while closing exhaust gas flow to muffler-filter apparatus 28. With plunger arm 46 midway between extremes of movement, sealing disks 50 close neither fluid communication path so that emissions from engine 22 may exhaust partially through both muffler-filter apparatuses 28 and 30.

Figure 2:
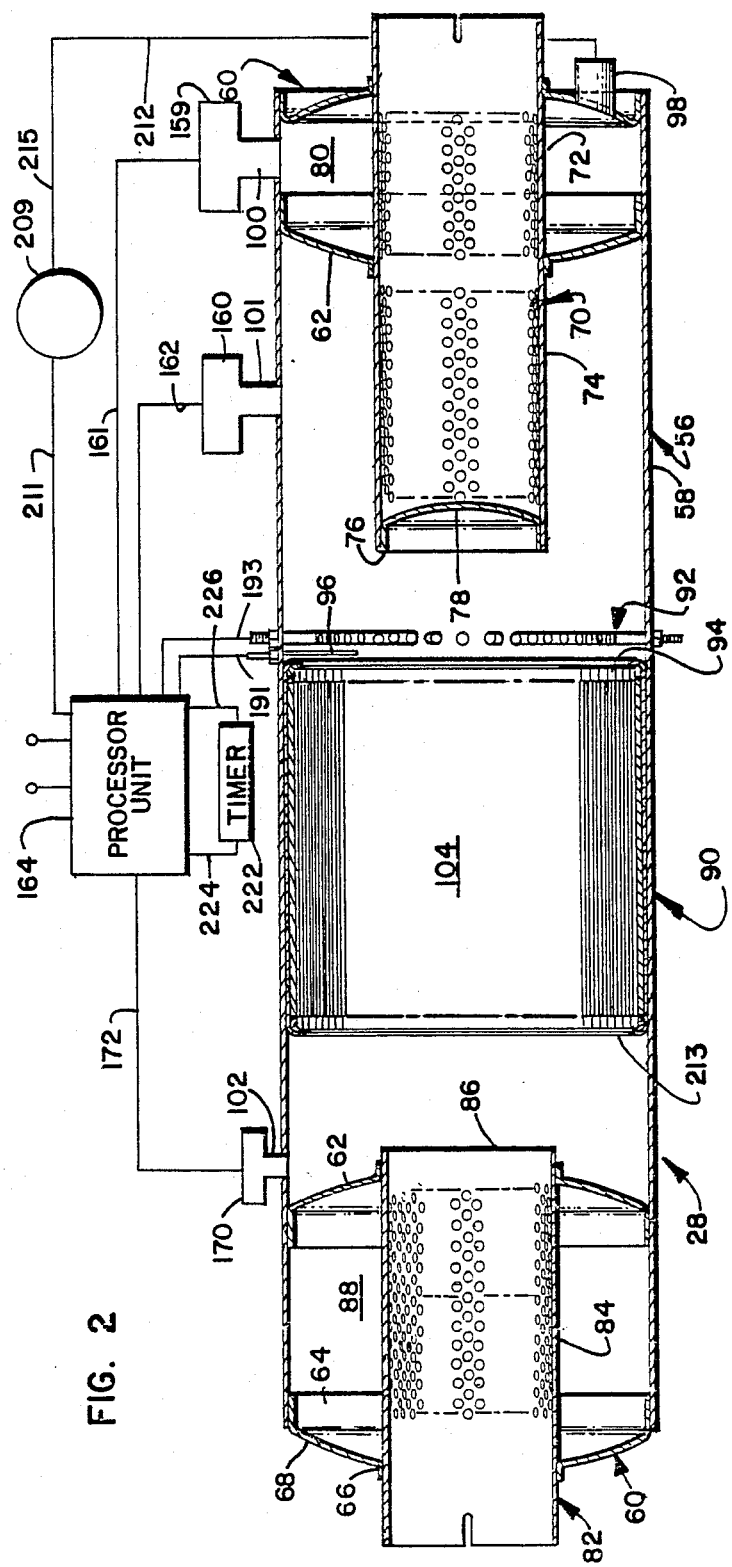
FIG. 2 is a cross-sectional view of muffler-filter apparatus in accordance with the present invention and also schematically illustrates a control system for the apparatus.

A typical muffler-filter apparatus, for example 28, in accordance with the present invention is shown in more detail in FIG. 2. Apparatus 28 includes housing 56 comprising a cylindrical wall 58 with opposite end walls 60 and interior baffle members 62. Each of end walls 60 and baffle members 62 are formed to have an outer circular flange 64 to be fastened to wall 58 along its interior and are also formed to have an inner circular flange 66 which forms an axially aligned opening. The wall 68 extending between flanges 64 and 66 is preferably formed to have a symmetric curvature to provide appropriate structural strength. Walls 68 of each pair of end walls 60 and baffle members curve convexly outwardly from one another.

An inlet pipe 70 is attached to and held by flanges 66 of the right-most pair of end wall 60 and baffle member 62. Pipe 70 is welded or otherwise fastened to be a part of line 38a which is in fluid communication through valve 26 and line 24 with engine 22. Inlet pipe 70 is perforated with a plurality of first openings 72 in a region between end wall 60 and baffle member 62 and is also perforated with a set of second openings 74 in a region between baffle wall 62 and the end 76 of inlet pipe 70. A closure member 78 prevents fluid communication from end 76 of inlet pipe 70. In this way, the chamber 80 formed between end wall 60 and baffle member 62 functions acoustically as a resonating chamber since openings 72 allow exhaust gases to flow therethrough and be muffled therein. Openings 74 allow exhaust gases to flow therethrough to a second chamber formed between baffle members 62 which functions acoustically as an expansion chamber and wherein filter module 90 is contained.

Similarly, an outlet pipe 82 is attached to and held by inner flanges 66 of the left-most pair of end wall 60 and baffle member 62. Outlet pipe 82 is fastened to exhaust tailpipe 42. Outlet pipe 82 includes a plurality of third openings 84 so that gases entering interior end 86 may flow through openings 84 and be muffled within third chamber 88 which then also functions acoustically as a resonating chamber, third chamber 88 being formed between end wall 60, baffle member 62 and outlet pipe 82.

A ceramic filter module 90 is fastened to cylindrical wall 58 between the interior ends 76 and 86 of inlet and outlet pipes 70 and 82 by friction fit, weld, bracket or other known mechanism (not shown). A heating element 92 is also attached in a known fashion to wall 58 between interior end 76 of inlet pipe 70 and filter module 90, and preferably in close proximity to the inlet end 94 of filter module 90 so as to heat the inlet end primarily by radiation. A temperature sensing device 96, such as a thermocouple, is located between heating element 92 and inlet end 94 of module 90. Temperature sensing device 96 senses fluid temperature in the region between heating element 92 and inlet end 94 for a control purpose described more fully hereinafter. Likewise, tube 98 providing fluid communication for combustion air from outside housing 56 into chamber 80 and fittings 100, 101 and 102, located to open into chamber 80 and located upstream and downstream from heating element 92 and filter module 90, but interior from resonating chambers 80 and 88, respectively, are all needed for system control and are explained more fully hereinafter.

It is noted that muffler-filter apparatus 28 includes reactive attenuation chambers in the form of resonating chambers at opposite ends of the housing and an expansion chamber therebetween. The invention is characterized by at least one reactive attenuation element. Such term, of course, is recognized by those skilled in the art to include more than expansion and resonating chambers. A reactive attenuation element is anything designed to attenuate sound by phase cancellation due to reflection so that one wave cancels another by approaching the other. Reactive attenuation is contrasted with passive, absorptive attenuation wherein flow does not pass therethrough, but amplitude is nevertheless damped thereby. Reactive attenuation is further contrasted with dissipated attenuation wherein sound is decreased, but not due to phase cancellation by interference.

Figure 6:
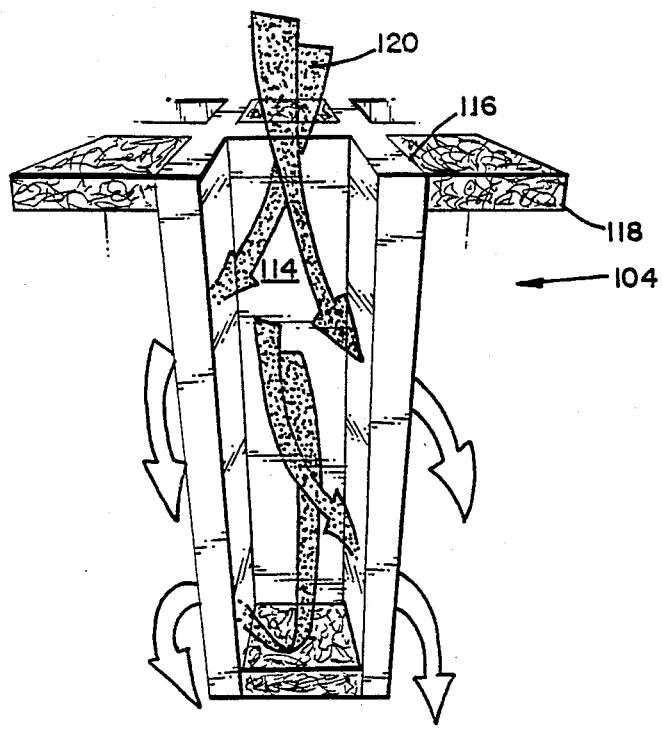
FIG. 6 illustrates the function of air being filtered with a ceramic filter element of the type used in the present invention.
Figure 5:
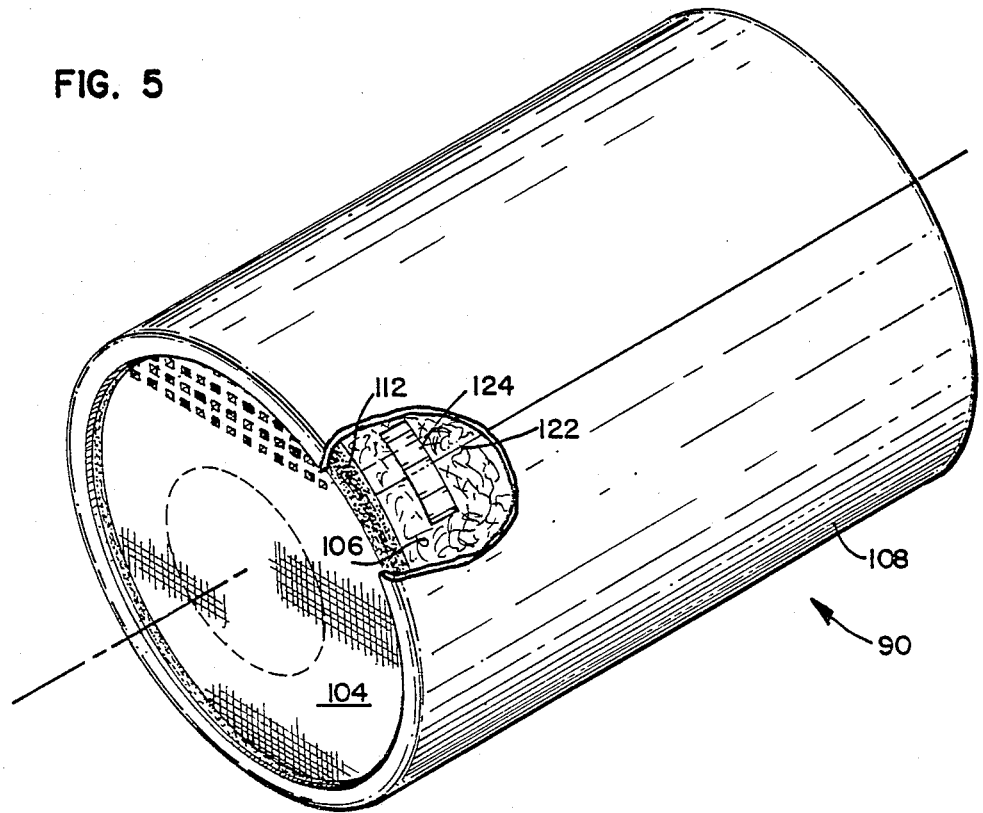
FIG. 5 is a perspective view, partially cut away, of a ceramic filter module in accordance with the present invention.
Figure 7:
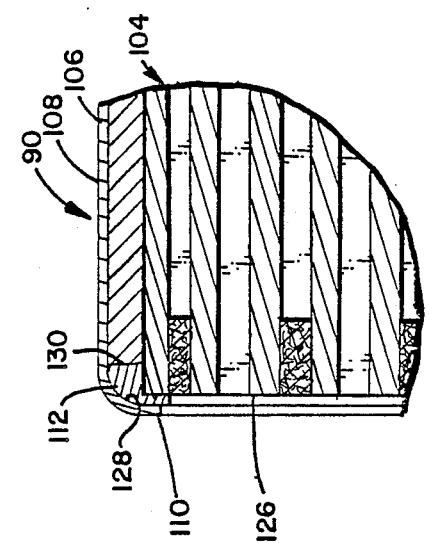
FIG. 7 is a cross-sectional detail view of a portion of the module of FIG. 5.

Ceramic filter module 90 is shown more particularly in FIGS. 5-7. Module 90 includes a cellular ceramic core 104 wrapped in a heat resistant, matted material 106 fitted within a metallic housing 108. The ends 110 of housing 108 are bent inwardly to hold core 104 in a significant axial compression, and a sealing material 112 provides a gasketing function between ends 110 and core 104 and a sealing function with respect to intumescent, heat resistant material 106.

As indicated, the filtration mechanism comprises ceramic core 104. Core 104 is an extruded ceramic which is fired so that the primary crystalline compound is preferably cordierite. Such component is commercially available for example from Industrial Ceramics Department, Ceramic Products Division, Corning Glass Works, Corning, N.Y. 14830. In addition, it is noted that the art of making ceramic filter materials is known, e.g., see U.S. Pat. Nos. 4,340,403; 4,329,162; and 4,324,572. The geometry of core 104 is illustrated in FIG. 6. Square shaped cells 114 are formed as parallel channels running the full length of the part. The walls 116 of channels 114 are porous, which allows them to be used as filter media. Opposite ends of adjacent channels are plugged with a ceramic material 118. This forces exhaust gases 120 through walls 116 so that soot is collected on the walls as the gases pass therethrough. The advantage of this type of construction is that high filtration area is available in a small volume.

Heat resistant material 106 provides both an intumescent, cushioning function for core 104 and a fireretardant, heat resisting barrier between core 104 and rigid housing 108. Material 106 is preferably cut at an angle with respect to a longitudinal axial plane so that mating ends 122 fit one over the other so as to eliminate a longitudinal slot and longitudinal leakage and the formation of a hot spot on housing 108 therealong. The ends 122 of material 106 are held together until placed within housing 108 by a plurality of strips of tape 124 or other equivalent fastening mechanism. A material 106 in sheet form is rather elastic below temperatures on the order of 100° C. Material 106 then provides a cushioning function. As material 106 heats to 100° C. or so and above, it intumesces as allowed and becomes a substantially rigid thermal insulator. At all temperatures, material 106 provides a seal against vapors, smokes and water. Thus, exhaust gases are prevented from exiting along the sidewall of core 104 and are directed through core 104 from the inlet end to the other. The art of making such material is well known, e.g., see U.S. Pat. No. 4,273,879. A representative material 106 is commercially available, for example, from Ceramic Materials Department, 3M Center, St. Paul, Minn. 55144.

As indicated, material 106 provides a cushioning function for ceramic element 104. Before heating, material 106 holds together as a fibrous sheet and is rather elastic. After heating, the binder in material 106 has burned off so that the remainder is fibrous and granular-like. Unless contained, material 106 in the cured state would fall apart. Nevertheless, when contained, material 106 transversely compresses core 104 so that in combination with the axial compression exerted by housing 108, core 104 is securely confined in a fashion to resist cracking or breakage due to normal use environmental conditions.

As indicated, material 106 is wrapped about the side region of core 104. In this configuration, material 106 has longitudinally opposite ends. The opposite ends are spaced from the inwardly turned ends 110 of housing 108. This creates a pair of circular grooves 128 between the core filter element 104 and housing 108 between the ends 130 of material 106 and the inwardly turned ends 110 of housing 108. The sealing material is fitted within grooves 128. The sealing material is preferably a compressible braided rope of fiberglass. In this way, material 112 may be placed in grooves 128 during the manufacturing process and appropriately deformed to function as a gasket between core 104 and ends 110 of housing 108 and to function as a seal for material 106.

Housing 108 is metallic, preferably an aluminized steel or a stainless steel, of about 18 gauge thickness.

The corners of the flat sheet which is formed to become housing 108 are notched so that when ends 110 are formed, the material formed is mainly the overlap layer in the seam area. The edges are welded together.

Figure 8A:
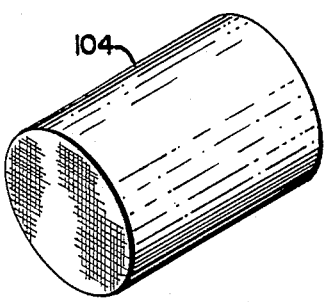
FIGS. 8A–F illustrate a method of making the module of FIG. 5.
Figure 8B:
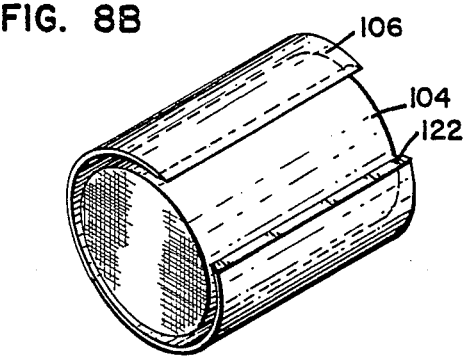
Figure 8C:
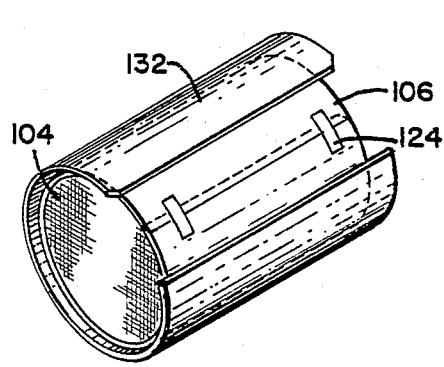
Figure 8D:
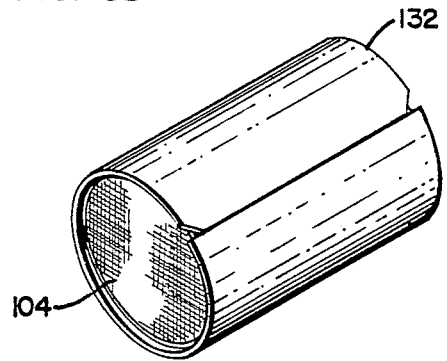
Figure 8E:
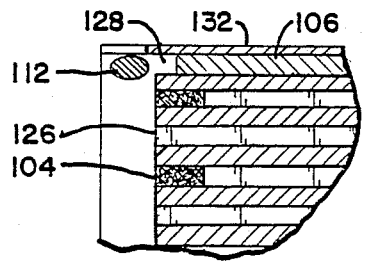
Figure 8F:
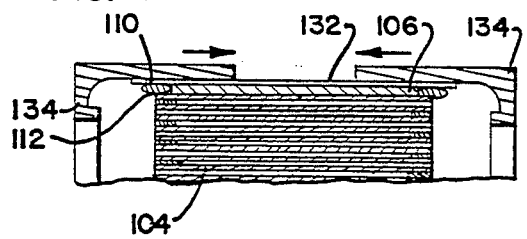

The method of making module 90 is illustrated in FIGS. 8A-8F. A cellular ceramic filter core 104 is shown in FIG. 8A. Core 104 is cylindrical. The matted heat resistant and intumescent cushioning material 106 is wrapped about core 104 as illustrated in FIG. 8B. Matted material 106 has a set of facing ends 122 cut diagonally with respect to a longitudinally axial plane of core 104. The facing ends mate with one another. When facing ends 122 are brought into contact with one another, they are retained with strips of tape 124 or other equivalent fastening mechanism. As shown in FIG. 8C, the wrapped core is then slipped into a prerolled metallic sheet 132 which will be further formed to become housing 108. With wrapped core 104 in place, prerolled sheet 132 is further squeezed or formed to a predetermined cylindrical dimension (see FIG. 8D). As shown in FIG. 8E, material 106 longitudinally does not extend to end 126 of core 104, while rolled sheet 132 extends beyond end 126. Thus, groove 128 is formed. A similar groove is formed at the other end. Sealing rope 112 is placed into grooves 128 at the ends of material 106. Finally, as shown in FIG. 8F, ends 110 of metallic sheet 132 are simultaneously curled inwardly as forming dies 134 are moved together. Dies 134 are moved toward one another with sufficient force (20,000 pounds or so) to curl not only ends 110, but also to put core 104 in significant axial compression. The facing edges of sheet 132 are welded together to form housing 108. Thus, core 104 is rigidly retained not only at its ends, but also by the snugly fitting material 106 held by cylindrically rigid housing 108. Although not always necessary before use, it is preferable as a final step in making module 90 to heat module 90 above 100° C. so that the binder in material 106 is burned off and material 106 uniformly intumesces.

Module 90, as described, or equivalent is attached within housing 56 of muffler-filter apparatus 28 between ends 76 and 86 of inlet and outlet pipes 70 and 82, respectively. Alternately, module 90 may be removably installed in housing 56 as indicated with respect to muffler-filter apparatus 30 in FIG. 1. A cylindrical clamp or other removable fastening mechanism 136 attaches end sections 138 and 140 of housing 56a together.

Heating element 92 which is located in close proximity with inlet end 94 of ceramic filter element 90 preferably provides a substantial amount of radiant heat energy directed toward end 94. In this regard, heating element 92 may be a metallic, electrically resistive element. Alternatively, a heating element 92', as shown in FIGS. 3 and 4, may be an electrically resistive element 142 embedded in a ceramic casting 144. In this regard, it is noted that with respect to alternate embodiments, parts which are the same as the preferred embodiment are denoted with primed numerals, while different parts are given new numerals.

Ceramic casting 144 is formed to include a plurality of rings of a plurality of openings 146 on both sides of the multi-ring heating element 142. Element 142 includes a pair of substantially parallel leads 148 which are also parallel to a radial line of disk-shaped casting 144. Openings 150 are formed between leads 148 and lead to a plurality of openings 152 at the center of casting 144. A sufficient number of various openings in casting 144 must be provided so that heating element 92' does not become a significant restriction with respect to exhaust gases flowing through muffler-filter apparatus 28.

As exhaust emission gases from engine 22 flow through muffler-filter apparatus 28, the gases first flow into inlet pipe 70 for sound attenuation at resonating chamber 80. Gases continue to flow through inlet pipe 70 to perforations 74. Gases are prevented from flowing directly through the outlet end of inlet pipe 70 by closure member 78. Consequently, gases flow from perforations 74 outwardly away from the central portion of housing 56. In this way, the greater flow of exhaust gases pass through the outer openings or spaces of heating element 92 or 92' and into an outer ring of cellular core 104. A greater concentration of particulates is thus formed in such outer ring. Such concentration of particulates in the outer ring is advantageous during regeneration of the ceramic core since heat does not then become concentrated at the center of core 104, but rather is more evenly distributed and even possibly somewhat more intense in the outer ring. Such flow leads to a heat distribution which may be dissipated in a way which minimizes significant uneven expansion or contraction and any resultant cracking. Closure member 78 accomplishes the indicated function as a part of inlet pipe 70 and alleviates any necessity for special flow directing structure adjacent to core 104.

Since module 90 is attached to housing 56 in a way which prevents gases from leaking past it without being filtered by it, gases pass through ceramic core 104 for entry to outlet pipe 82. While passing through outlet pipe 82, sound is attenuated further at the expansion chamber between baffles 62 and at the resonating chamber 88.

Figure 11A:
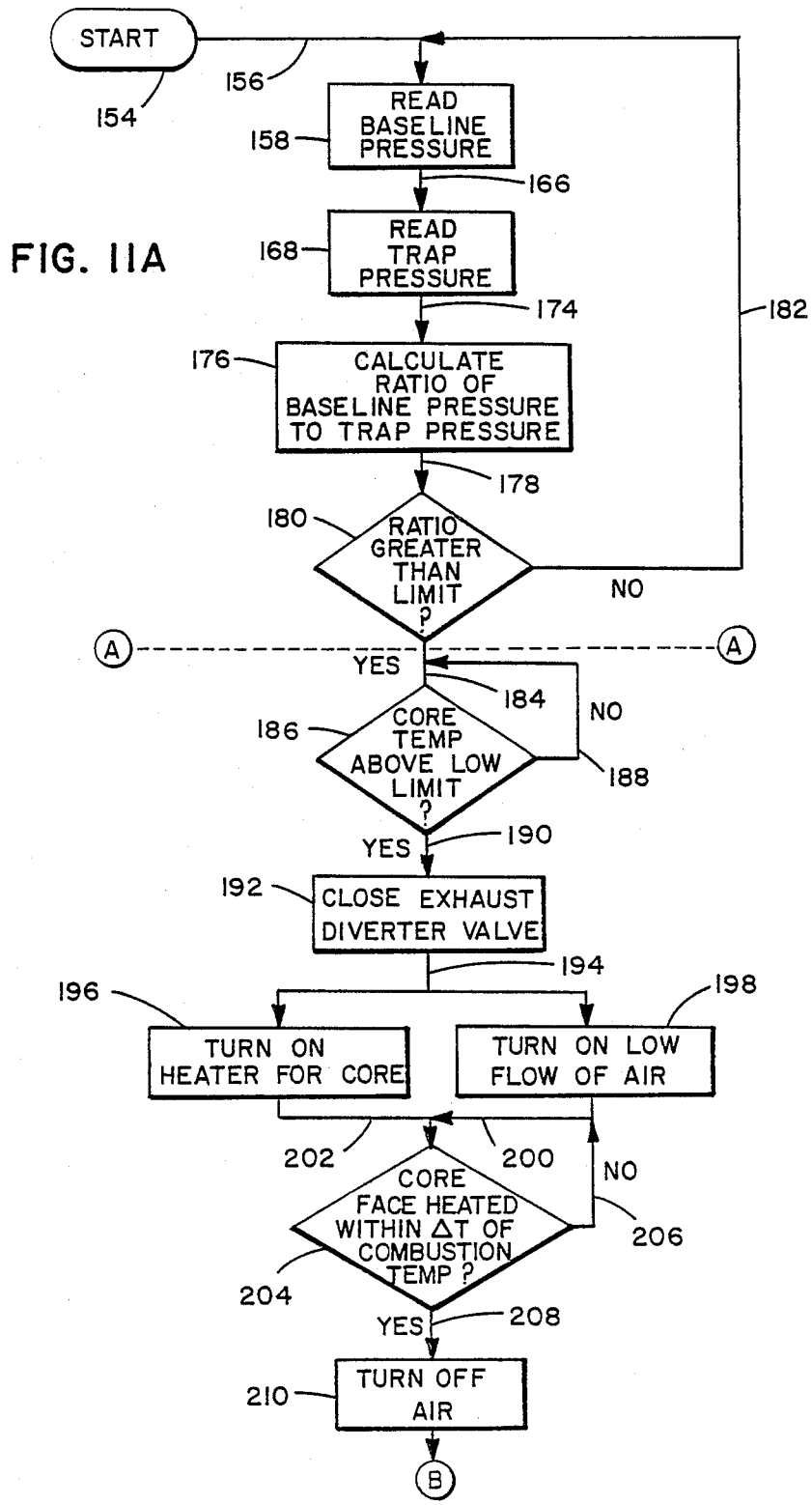
FIGS. 11A–B show a logic diagram for using an exhaust system in accordance with the present invention.
Figure 11B:
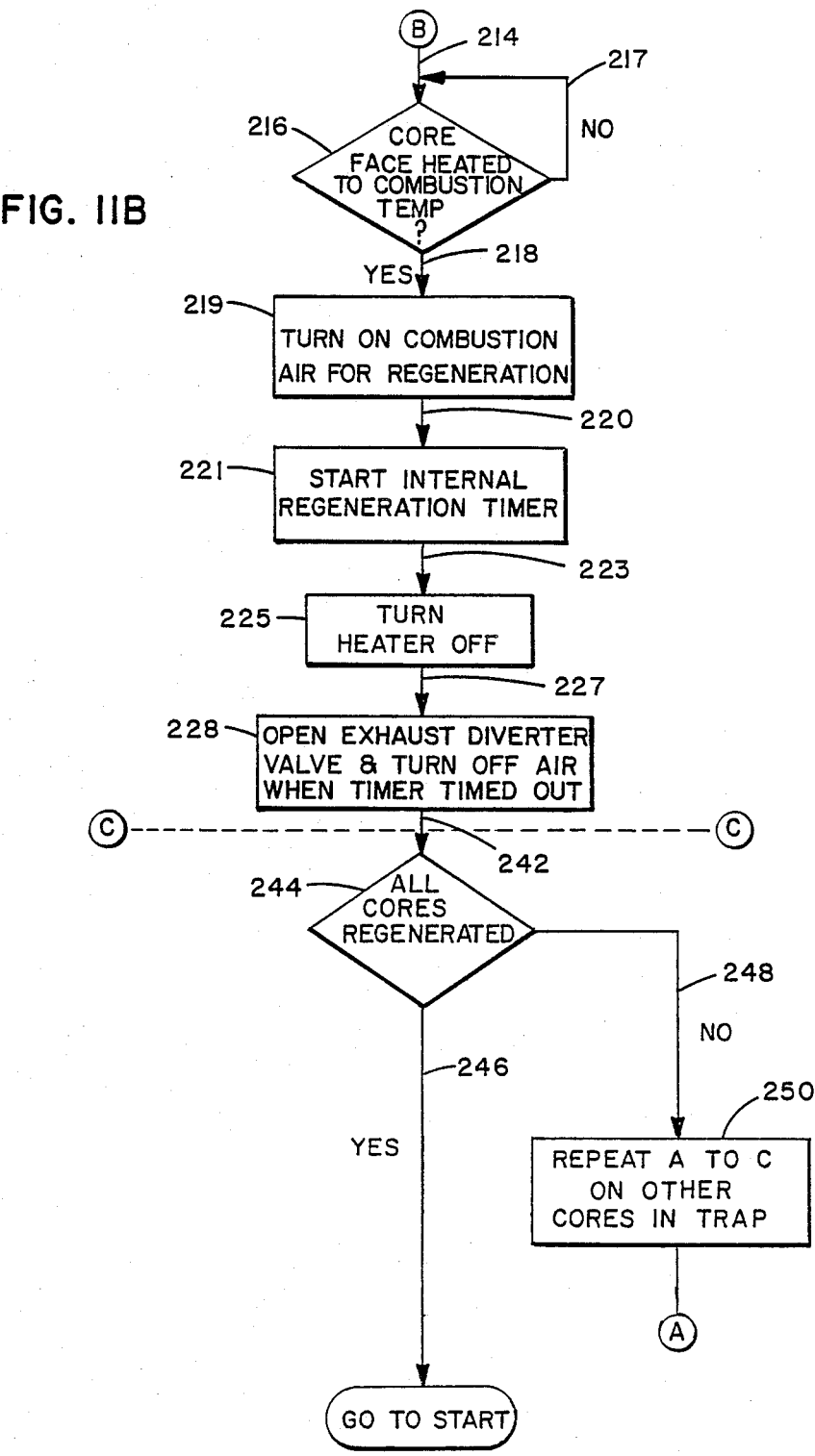

Over time, filter module 90 traps a great enough quantity of particulates so as to begin to form a pressure restriction of significance. When this occurs, module 90 must be regenerated. The method of regeneration is illustrated by the logic diagram of FIGS. 11A and 11B. As the diagram indicates, the logic begins at "start" box 154 and leads via line 156 to step 158 of reading the base line differential pressure. With reference to FIG. 2, base line differential pressure is obtained with pressure transducers 159 and 160 attached to fittings 100 and 101. Signals representing the pressure values are sent via lines 161 and 162 to a processing unit 164. As further shown in FIG. 2, baseline pressure differential is the pressure differential across inlet pipe 70 by the exhaust flow through perforations 72 and 74 upstream from heating element 92 and filter module 90.

Next, the logic diagram leads via line 166 to step 168 of reading trap differential pressure. Trap differential pressure is obtained with pressure transducers 160 and 170 attached to fittings 101 and 102 which send signals corresponding to the pressure read via lines 162 and 172 to processing unit 164. Trap differential pressure is read across filter module 90 and upstream from outlet pipe 82.

Next, the logic diagram shows line 174 leading to step 176 of calculating the ratio of baseline differential pressure to trap differential pressure. Then, via line 178 leading to step 180, the ratio is compared to a limit value. If the ratio is less than the limit value, then as line 182 shows, the logic is restarted and the pressures are reread and compared as indicated.

Line A—A divides the logic related to determining when regeneration is needed from logic related to actual regeneration. If the ratio is greater than the limit value, then as line 184 indicates leading to step 186, the core temperature or a temperature between core 104 and heating element 92 is determined and compared to a predetermined low limit temperature. This is necessary to make certain that regeneration does not occur when the engine is not running. The temperature is measured by thermocouple or sensing device 96 and sent via line 192 to the processor unit 164. If the temperature is below the limit value, as logic line 188 indicates, the temperature will be resampled. When the core temperature is found to be above the limit value, then logic line 190 leads to step 192 of closing the diverter valve. In the case of system 20, valve 29 would be closed and valve 33 opened. In the case of system 20a, diverter valve 26 would be closed with respect to the particular muffler-filter apparatus to be regenerated.

The logic diagram then shows line 194 leading to parallel steps 196 and 198 which occur preferably at about the same time. Step 196 shows heating element 92 being turned on. Step 198 shows a low flow of air from source 210 being initiated. The low level flow rate is preferably less than half the flow rate of combustion air. The function of the low flow of air is to aid in moving warmed air around heating element 92 to the face of core 104, thereby better utilizing the heat and also to partially warm a depth beyond the face of core 104 by moving some warm air thereinto. It is noted, however, that step 198 is not needed for effective regeneration.

With air on and the core heating, as shown by lines 200 and 202 leading to step 204, temperature is again sensed and compared to a predetermined temperature which is less than the carbon particulate combustion temperature. If the predetermined temperature has not been reached, then as line 206 shows, temperature sensing continues. Once the predetermined temperature is sensed, as line 208 leading to step 210 indicates, the low flow of air is turned off.

It is pointed out that the reduced air flow during warm-up of core 104 assures sufficient core temperature to a sufficient depth to prevent a quench condition for the flame when combustion occurs.

The logic diagram then shows line 214 leading through circle B (which shows where FIGS. 11A and 11B connect) to step 216 wherein the temperature sensed by thermocouple 96 is compared to the known combustion temperature of diesel particulates. As indicated hereinbefore, it is understood that the temperature sensed by thermocouple 96 could be the temperature of heating element 92, the temperature of the inlet end 94 of ceramic element 104 or the temperature of the gaseous fluid therebetween. If the temperature is less than the combustion temperature, then as shown by line 217 temperature continues to be sensed. When the sensed temperature is found to have reached the combustion temperature, then as shown by line 218 leading to step 219 the air compressor 209 or other air source is turned on so that air may flow through line 212 to inlet tube 98. The combustion air from source 209 enters muffler apparatus 28 via line 215 and tube 98 at resonating chamber 80 and flows in perforated openings 72 and out perforated openings 74 to heating element 92 and finally filter core 104. With the temperature high enough and combustion air present, the particulates ignite and begin burning along a flame surface module 90. It is noted that compressor or source 209 is controlled by processing unit 164 via line 211.

As shown by logic line 220 leading to step 211, internal regeneration timer 222 is preferably started at the same time or shortly after thermocouple 96 senses ignition temperature. Timer 222 is in electrical communication with processor unit 164 via lines 224 and 226 as shown on FIG. 2. As indicated in the logic diagram, line 223 leads to step 225 wherein the heating element is turned off some time after combustion air is turned on. Then as shown by line 227 leading to step 228, the diverter valve is opened and the air compressor or source 209 is turned off after the timer times out. It is noted that the time period of timer 222 is sufficiently long to allow complete burning of the particulates in core 104 and, therefore, complete regeneration of core 104, or until sufficient soot is removed to permit safe operation of engine flows.

Line C—C divides the regeneration logic from logic related to regenerating multiple units and/or resetting the just regenerated unit. As shown by logic line 242 leading to decision step 244, the logic sequence is returned via line 246 to start step 154 if the exhaust system has only a single muffler apparatus with a bypass muffler. As shown by logic line 248 leading to step 250, the logic sequence is cycled for a second core, if such is present, as in system 20a of FIG. 1A.

Figure 9:
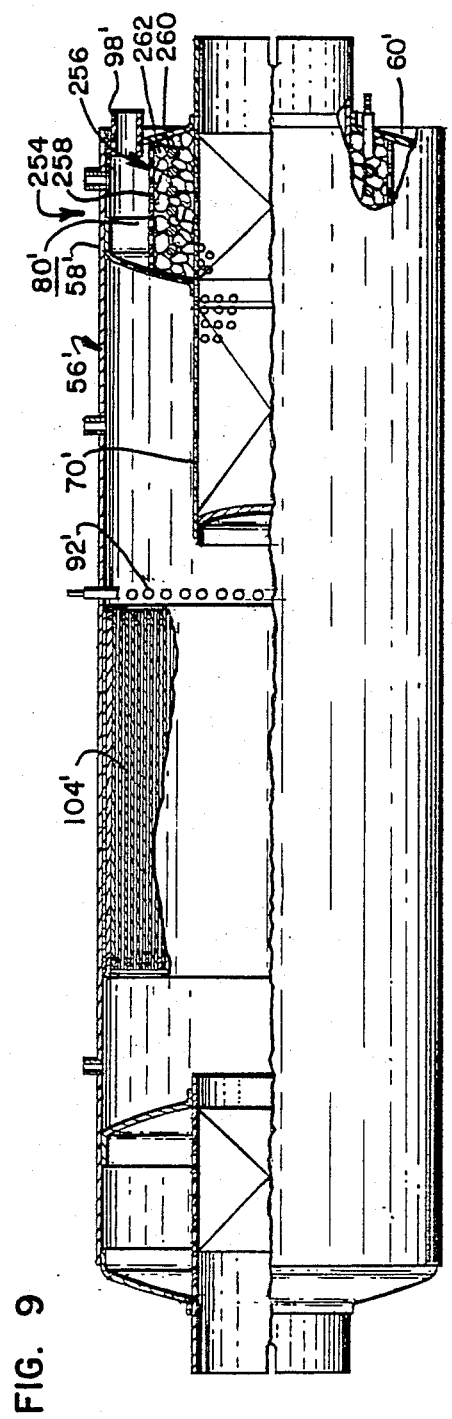
FIG. 9 is a side view in partial cross-section of an alternate embodiment of muffler-filter apparatus in accordance with the present invention.
Figure 10:
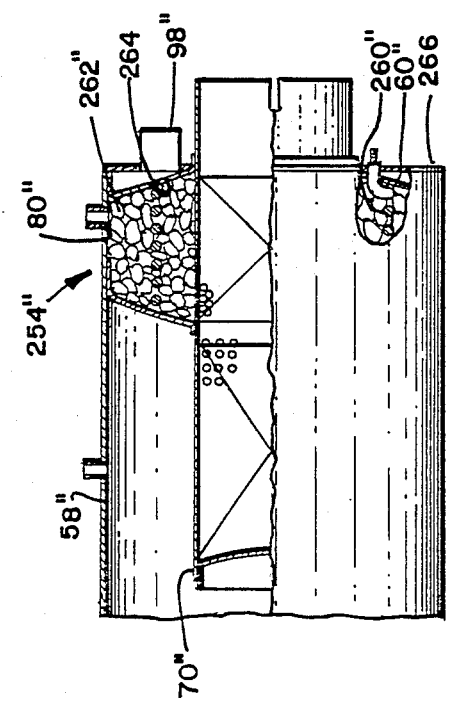
FIG. 10 is another alternate embodiment of muffler-filter apparatus.

It is noted that alternate embodiments as shown in FIGS. 9 and 10 include a combustion air preheating system 254 (FIG. 9) or 254" (FIG. 10). Preheating system 254 is formed in resonating chamber 80'. Preheating system 254 includes a cylindrical wall 256 concentric with inlet pipe 70' and cylindrical wall 58' of housing 56'. Wall 256 is perforated with openings 258 so that combustion air from inlet tube 98' entering the outer annular space may diffuse through openings 258 along the longitudinal and circumferential extent of wall 256. A heating element 260 formed as a double helix is attached to end 60' and fits about midway between inlet pipe 70' and cylindrical wall 256. The space within resonating chamber 80' between inlet pipe 70' and cylindrical wall 256 is filled with a granular, nonmetallic, gravel or ceramic pellet or bead or ball, etc., 262 so as to function as a heat storage bed. Preferably, the granular material 262 has a specific heat greater than the surrounding metal, for example, about 0.2 BTU/LB ° F. In this way, heating element 260 heats the granular material, and the combustion air diffuses through it and is substantially heated thereby before flowing into and out of inlet pipe 70' and through heating element 92' to core 104'.

Alternately, as shown in FIG. 10, preheating system 254" may be formed such that granular material 262" completely fills resonating chamber 80". Heating element 260" is preferably a double helix, but larger than the element of FIG. 9 so that it is located approximately half way between inlet pipe 70" and cylindrical wall 58". In this configuration, end 60" is perforated with openings 264. A flat, radial wall 266 is installed outwardly of end 60" so that a small diffusion chamber is formed in an annular, approximately triangular cross-sectional space surrounding inlet pipe 70". Inlet tube 98" is attached to flat outer wall 266 and opens into the annular diffusion space. In this embodiment, combustion air flows in inlet tube 98" to the diffusion space and through perforations 264 to resonating chamber 80". The air is heated as it continues to diffuse through the granulated material 262" past heating element 260" to inlet pipe 70" whereafter the air flows as adequately described hereinbefore.

Preheating systems 254 or 254" are preferably connected with (not shown) and controlled by processor unit 164 and are turned on prior to closing the exhaust diverter valve at step 192 and are left on for a predetermine variable time. The idea is that the granular material 262 is allowed to be heated and store the heat before air is passed therethrough for warming. The heating of the granular material can occur while exhaust gases are still passing through the muffler-filter apparatus.

Figure 12:
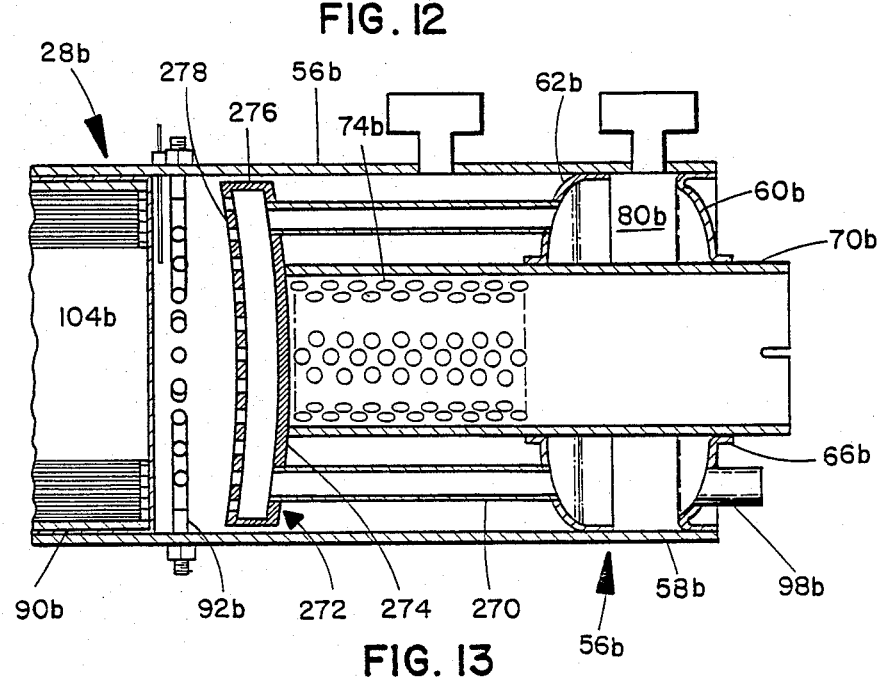
FIG. 12 is still another alternate embodiment of the front or inlet portion of muffler-filter apparatus.
Figure 13:
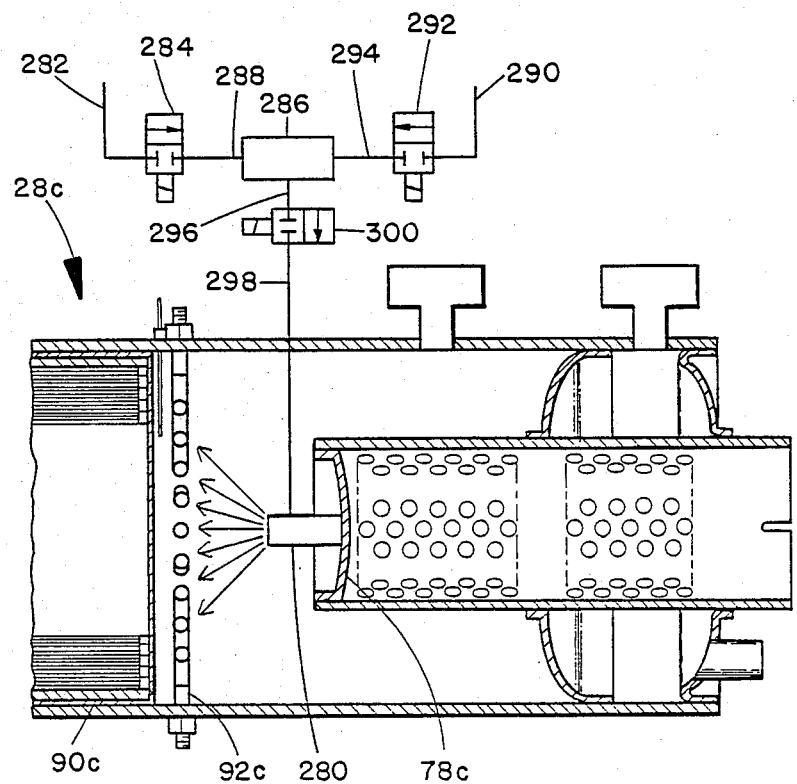
FIG. 13 is yet another alternate embodiment of the front portion.

Alternate inlet ends for a muffler-filter apparatus are shown in FIGS. 12 and 13. With respect to this alternate embodiment, equivalent elements with the preferred embodiment are designated by the same numeral along with the letter "b" for FIG. 12 and the letter "c" for FIG. 13. Housing 56b includes an end wall 60b and an interior baffle member 62b to form a chamber 80b therebetween. Inlet pipe 70b is attached to and held by flanges 66b. Inlet pipe 70b is not perforated to allow fluid communication with chamber 80b but is perforated downstream from baffle member 62b as shown by opening 74b. As with the preferred embodiment, housing 56b contains a ceramic module 90b and a heating element 92b for heating the carbon on the face of core 104b of module 90b. Embodiment 28b is distinguished from the other embodiments by the closure for inlet pipe 70b and the directing of combustion air to module 90b. In this regard, tube 98b leads from a source (not shown) to chamber 80b. A plurality of tubes 270 extend from baffle 62b to an enclosure 272. Tubes 270 provide fluid communication between chamber 80b and enclosure 272, as well as help support enclosure 272. Enclosure 272 has a side 274 away from module 90b which forms the closure member for inlet pipe 70b. Faced away from side 274 by a wall 276 is a perforated side 278. Enclosure 272 is formed so that wall 276 is spaced somewhat from wall 58b of housing 56b. The gap allows for the flow of exhaust gases from inlet pipe 70b and perforations 74b to bypass enclosure 272 and flow toward module 90b. Combustion air flows in tube 98b to chamber 80b which functions as a manifold for the plurality of tubes 270. Air flows through tubes 270 to enclosure 272 and then out the preferably uniformly distributed openings of perforated side 278 so as to provide a uniform flow toward module 90b.

Embodiment 28c is the same as the preferred embodiment, except a mechanism for atomizing a combustible, preferably diesel fuel, and injecting it onto heating element 92c is shown. When the combustible ignites, a very hot heat source is provided and the face of module 90c may be warmed more quickly. In this way, less electrical power is needed for the heating with element 92c.

An atomizing element 280 is fastened as required to closure member 78c. Appropriate atomizing elements are known to those skilled in the art. Both air and fuel are provided to the atomizing element. This can be done in a number of ways. As shown in FIG. 13, an air line 282 is connected through a normally closed, two-way, two-position solenoid valve 284 to a mixing chamber 286 via a line 288. Similarly, a combustible, like diesel fuel, is directed through a line 290 to a normally closed, two-way, two-position, solenoid valve 292 and then to mixing chamber 286 via line 294. From mixing chamber 286, the mixture is directed via lines 296 and 298 through another normally closed, two-way, two-position, solenoid valve 300 to atomizing element 280.

Thus, the present exhaust system 20 may be embodied in a variety of alternatives. The heart of the system, however, is a ceramic filter element module in conjunction with a muffling mechanism and mechanism for regenerating the filter element. Although the various embodiments have been described in detail and the advantages of structure and function set forth, it is understood that other equivalents may be possible as well. Therefore, it is finally understood that any changes made in structure with respect to the disclosed embodiments, especially in matters of shape, size and arrangement, to the full extent extended by the general meaning of the terms in which the appended claims are expressed, are also within the principle of the present invention.

What is claimed is:

1. A method for removing oxidizable particulates from a filter trap in a muffler apparatus, said muffler apparatus including a housing having an inlet, an outlet, and a fluid flow passage for exhaust gases leading from said inlet upstream to said outlet downstream, said fluid flow passage including a reactive acoustic element, said muffler apparatus also including in said fluid flow passage means for filtering the particulates from the exhaust gases, said muffler apparatus still further including means for heating an inlet end of said filtering means and means for blowing air through said heating means toward the inlet end of said filtering means, said muffler apparatus yet further including valve means for controlling the flow of exhaust gases to said housing, said muffler apparatus also including first means for sensing a first pressure differential upstream of said filtering means and a second pressure differential across said filtering means and first means for comparing said first and second pressure differentials to a predetermined value to identify a first triggering relationship, said particulates having a combustion temperature, said muffler apparatus also including a second means for sensing one of temperature of said heating means, temperature of fluid between said heating means and said filtering means and temperature of said filtering means inlet end, second means for comparing said temperature relative to a predetermined temperature less than the combustion temperature to identify a second triggering relationship, and third means for comparing said temperature relative to the combustion temperature to identify a third triggering relationship, said muffler apparatus also including means for timing a predetermined period, said method comprising the steps of:

identifying the first triggering relationship;
closing with said valve means flow of exhaust gases to said housing after said first triggering relationship;
turning on said heating means after said valve means closing step;
starting said air blowing means after said valve means closing step;
identifying said second triggering relationship;
stopping said air blowing means after said second triggering relationship;
identifying said third triggering relationship;
starting said air blowing means after said third triggering relationship;
starting said timing means after said third triggering relationship;
stopping said heating means during the timing of said timing means;
stopping said air blowing means after said timed period; and
opening with said valve means flow of exhaust gasses to said housing after said timed period.

2. The method in accordance with claim 1 wherein said first step starting said air blowing means starts said air blowing means at a reduced flow and said second step starting aid air blowing means starts said air blowing means at a significantly increased flow.

3. A particulate filter module, comprising:
a ceramic filter element having opposite ends and a longitudinal side region therebetween;
a rigid housing having a wall enclosing said side region of said filter element, said wall being formed so as to leave a space between it and said side region, said wall having inwardly turned ends to longitudinally compress said filter element;
means, within said space, for intumescing so that said ceramic filter element is held in transverse compression by said; wall and
means for sealing said intumescing means in said space between said filter element and said wall.

4. Muffler apparatus for reducing both sound and particulates from exhaust gases from an engine, comprising:
a housing having an inlet, an outlet, and a fluid flow path leading from said inlet upstream to said outlet downstream;
a reactive ocoustic element within said housing along said fluid flow path, said element attenuating the sound of said exhaust gases;
means, within said housing along said fluid flow path, for filtering the particulates from said exhaust gases, said filtering means including a ceramic filter element having an inlet end;
means for regenerating said ceramic filter element; and
means for controlling said regenerating means.

5. Apparatus in accordance with claim 4 wherein said regenerating means includes means for primarily radiantly heating the inlet end of said filter element.

6. Apparatus in accordance with claim 5 wherein said regenerating means also includes means for blowing combustion air through said heating means toward the inlet end of said filter element.

7. Apparatus in accordance with claim 6 including means, within said housing, for preheating said combustion air upstream from said heating means.

8. Apparatus in accordance with claim 7 wherein said housing inlet includes a pipe with a downstream end and a plurality of openings upstream from said downstream end, said apparatus further including a chamber within said housing and about said inlet pipe, one of said openings providing fluid communication between said pipe and said chamber, said combustion air blowing means including means for inletting combustion air into said chamber, said preheating means being within said chamber.

9. Apparatus in accordance with claim 8 wherein said preheating means includes a heating element and said chamber includes a granular material between said pipe and said heating element, said granular material storing heat from said heating element and requiring the combustion air to diffuse therethrough to be heated thereby.

10. Apparatus in accordance with claim 9 wherein said combustion air blowing means includes an air source and wherein said combustion air inletting means includes a wall having a plurality of openings therein distributing combustion air from said source into said granular material.

11. Apparatus in accordance with claim 6 wherein said housing includes a baffle separating said housing into adjacent chambers, said controlling means including first means for sensing a first pressure differential across said baffle and a second pressure differential across said ceramic filter element, said controlling means also including first means for comparing said first and second pressure differentials relative to a predetermined value to identify a first triggering relationship, said controlling means also including first means for starting said heating means when said first comparing means has identified said first triggering relationship.

12. Apparatus in accordance with claim 11 wherein said controlling means includes second means for starting said air blowing means.

13. Apparatus in accordance with claim 12 wherein said controlling means includes second means for sensing one of temperature of said heating means, temperature of fluid between said heating means and said ceramic filter element, and temperature of said ceramic filter inlet end, said particulates having a combustion temperature and said controlling means further including second means for comparing said one temperature relative to a predetermined temperature less than the combustion temperature to identify a second triggering relationship, said controlling means still further including first means for stopping said air blowing means when said second comparing means has identified said second triggering relationship.

14. Apparatus in accordance with claim 13 wherein said controlling means further includes third means for comparing said one temperature relative to said combustion temperature to identify a third triggering relationship, said controlling means also including third means for starting said air blowing means after said third comparing means has identified said third triggering relationship, said controlling means also including means for timing a predetermined period beginning after said third comparing means has identified said third triggering relationship, said controlling means further including second means for stopping said air blowing means at the end of said period.

15. Apparatus in accordance with claim 5 wherein said heating means includes an electrical heating element embedded in a ceramic plate, said ceramic plate having an opening therein to pass exhaust gases therethrough.

16. Apparatus in accordance with claim 4 wherein said ceramic filter element is cylindrical and has a central portion at said inlet end including and surrounding the axis, said apparatus further including means, within said housing along said fluid flow path, for deflecting exhaust gases outwardly away from said central portion, thereby forming a ring outside said central portion having a greater concentration of particulates, said housing inlet including a pipe with a downstream end, said pipe including a plurality of openings upstream from said downstream end, said deflecting means including an end cap fastened to said pipe at said downstream end to prevent fluid flow from said end thereby requiring fluid entering said pipe to exit through said openings.

17. Apparatus in accordance with claim 4 wherein said controlling means include valve means for selectively directing said exhaust gases one of through said housing and away from said housing, said controlling means including means for sensing a first pressure differential upstream from said ceramic filter element and a second pressure differential across said ceramic filter element, said controlling means also including means for comparing said first and second pressure differentials relative to a predetermined value to identify a triggering relationship, said controlling means further including means for shifting said valve means from directing said exhaust gases through said housing to directing said exhaust gases away from said housing when said comparing means has identified said triggering relationship.

18. Apparatus in accordance with claim 17 wherein said valve means includes a two-way, two position valve.

19. Apparatus in accordance with claim 17 wherein said valve means includes a three-way, three position valve.

20. Muffler apparatus for filtering particulates from exhaust gases from an engine, comprising:
- a housing having means upstream for inletting said exhaust gases and means downstream for outletting said exhaust gases, said housing including spaced-apart ends and a wall enclosing an interior space extending between said ends, said housing also including a baffle attached to said wall to divide said interior space into first and second chambers, said inletting means including an inlet pipe passing through and supported by one of said ends and said baffle, said inlet pipe having inlet and outlet ends and an interior therebetween, said inlet pipe further having first perforations to provide fluid communication between the interior of said inlet pipe and said first chamber and second perforations to provide fluid communication between the interior of said inlet pipe and said second chamber, said inlet pipe also having valve means for controllably closing said inlet end and a closure member closing said outlet end so as to direct fluid from the interior of said inlet pipe outwardly through said second perforations;
- a ceramic filter element mounted in said housing, said ceradic filter element having an inlet end and an outer surface, said outer surface being sealed with respect to the wall of said housing so as to force fluid to pass through said ceramic filter element;
- means, mounted in said housing, for heating a portion of said ceramic filter element;
- means for blowing air into said first chamber so that the air must flow through said first perforations into the interior of said inlet pipe before being directed outwardly through said second perforations and past said heating means to said ceramic filter element; and
- means for controlling said valve means, said heating means and said air blowing means, said controlling means including first means for sensing a first pressure differential upstream from said ceradic filter element and a second pressure differential across said ceramic filter element, said controlling means also including first means for comparing a ratio of said first and second pressure differentials relative to a predetermined value to identify a first triggering relationship, said controlling means also including means for shifting said inlet pipe valve means closed after said first comparing means has identified said first triggering relationship, said controlling means further including means for starting said heating means after said first comparing means has identified said first triggering relationship, said controlling means still further inducing second means for sensing one of temperature of second heating means, temperature of fluid between said heating means and said ceramic filter element, and temperature of said ceramic filter inlet end, said controlling means also having second means for comparing said temperature relative to a predetermined combustion temperature to identify a second triggering relationship, said controlling means also including means for starting and means for stopping said air blowing means at times between said first and second triggering relationships, said controlling means further including means for timing a predetermined period after said second triggering relationship and a means for stopping said heating means and said air blowing by the end of said period, said controlling means also including means for opening said inlet pipe valve means after said period;
- whereby the exhaust gases flow through said housing from the inlet end of said inlet pipe to said outletting means.

21. Muffler apparatus for reducing both sound and particulates from exhaust gases from an engine, said apparatus comprising:
- a muffler-filter device including a housing having an inlet, an outlet, and a fluid flow path leading from said inlet to said outlet, said housing containing a first reactive acoustic element, said housing also containing means for filtering the particulates from the exhaust gases, said filtering means including a ceramic filter element, said device including means for regenerating said ceramic filter element;
- a muffler including a second reactive acoustic element;
- first means for fluidly communicating between said engine and said muffler-filter device, said first communicating means including a first valve;
- second means for fluidly communicating between said engine and said muffler, said second communicating means including a second valve; and
- means for controlling said regenerating means and said first and second valves, said controlling means positioning one of said first and second valves open and the others closed.

22. Muffler apparatus for reducing the sound of exhaust gases from an engine, said apparatus comprising:
- first and second muffler devices, each of said first and second duffler devices having a reactive attenuation chamber, said first muffler device including means for filtering particulates from the exhaust gases, said filtering means including a ceramic filter element;
- means for periodically regenerating said filtering means, said regenerating means including means for heating one end of said filter element and means for blowing combustion air through said heating means toward said filter element;
- valve means for Controlling the flow of exhaust gases to said first and second muffler devices;
- means for connecting said first and second muffler devices, said valve means and said engine in fluid communication so that said first and second muffler devices are in a parallel combination; and
- means for controlling said regenerating means and said valve 23. Apparatus in accordance with claim 22 wherein said valve means includes a three-way, three position valve, said valve in said first position placing said engine in fluid communication with both of said first and second muffler devices, said valve in said second position placing said engine in fluid communication with only said first muffler device, said valve in said third position placing said engine in fluid communication with only said second muffler device.

24. Apparatus in accordance with claim 22 wherein said connecting means includes a pipe from said engine splitting into a pair of legs, said valve means including a two-way, two position valve in each leg of said pair of legs of said pipe.

25. A method for making a particulate filter module, said module including a ceramic filter element having opposite ends and a side region therebetween, said module including a housing formed from a cylindrical metallic sheet which encloses the side region of the filter element and has inwardly turned ends to retain said ilter element therebetween, said module further including a heat resistant material between said filter element and said housing and sealing means between said heat resistant material and said inwardly turned ends, said method comprising the steps of:
- wrapping the side region of said ceramic filter element with said heat resistant material;
- slipping said wrapped ceramic filter into said housing;
- placing said sealing means at ends of said heat resistant material; and
- forming said inwardly turned ends on said housing to compress a portion of said sealing means between said ceramic filter element and each of said inwardly turned ends of said housing.

26. The method in accordance with claim 25 including prerolling a metallic sheet before slipping said wrapped ceramic filter into it and after slipping said wrapped ceramic filter into said prerolled metallic sheet squeezing said rolled sheet to a predetermined cylindrical dimension and welding facing edge portions together.

27. A method for making a particulate filter module, said module including a ceramic filter element having opposite ends and a side region therebetween, said module including a cylindrical metallic housing enclosing the side region of the filter element and having inwardly turned ends to retain said filter element therebetween, said module further including an intumescent resistant material between said filter element and said housing and sealing means between said intumescent material and said inwardly turned ends, said method comprising the steps of:
- wrapping the side region of said ceramic filter element with said intumescent material;
- slipping said wrapped ceramic filter into said housing;
- placing said sealing means at ends of said intumescent material;
- forming said inwardly turned ends on said housing to compress a portion of said sealing means between said ceramic filter element and each of said inwardly turned ends of said housing; and
- heating said module so that said intumescent material intumesces.

* * * * *

UNITED STATES PATENT AND TRADEMARK OFFICE
CERTIFICATE OF CORRECTION

PATENT NO. : 4,851,015
DATED : July 25, 1989
INVENTOR(S) : Wayne M. Wagner et al.

It is certified that error appears in the above-identified patent and that said Letters Patent is hereby corrected as shown below:

Column 11, line 64, after "surface" insert--from inlet end 94 to outlet end 213 of core 104 of filter--.

Column 11, line 67, "211" should be--221--.

Column 15, line 4, "aid" should be--said--.

Column 15, line 16, "said; wall and" should be--said wall; and--

Column 15, line 25, "ocoustic" should be--acoustic--.

Column 16, line 63, "one of through" should be--through one of--.

Column 17, line 39, "ceradic" should be--ceramic--.

Column 17, line 54, "ceradic" should be--ceramic--.

Column 18, line 47, "duffler" should be--muffler--.

Column 19, line 16, "ilter" should be--filter--.

Signed and Sealed this

Twenty-fifth Day of December, 1990

*Attest:*

HARRY F. MANBECK, JR.

*Attesting Officer*  *Commissioner of Patents and Trademarks*